R. C. JOHNSON.
TEAPOT, COFFEE POT, AND LIKE VESSEL.
APPLICATION FILED NOV. 3, 1917.
1,380,066. Patented May 31, 1921.
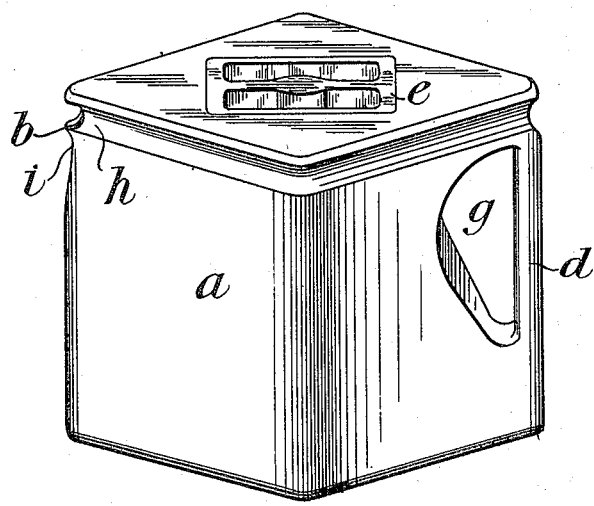
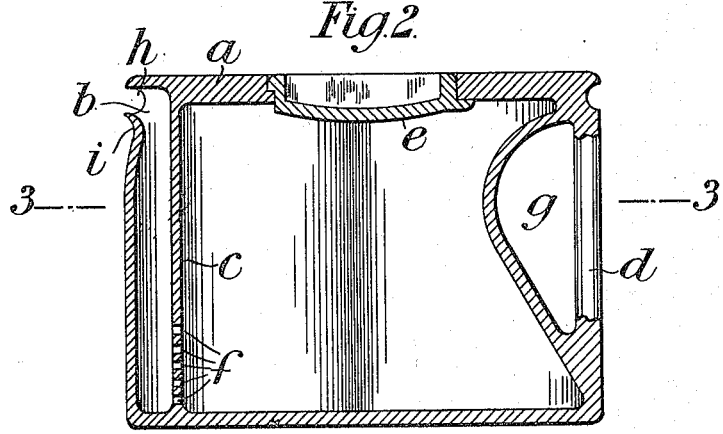
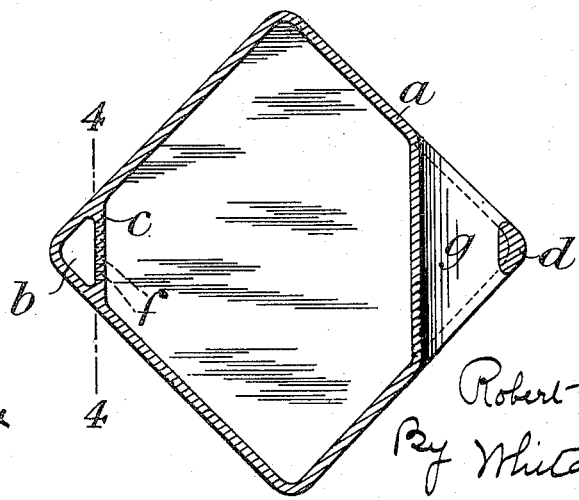

UNITED STATES PATENT OFFICE.

ROBERT CRAWFORD JOHNSON, OF LEICESTER, ENGLAND.

TEAPOT, COFFEE-POT, AND LIKE VESSEL.

1,380,066.   Specification of Letters Patent.   Patented May 31, 1921.

Application filed November 3, 1917.  Serial No. 200,082.

*To all whom it may concern:*

Be it known that I, ROBERT CRAWFORD JOHNSON, a subject of the King of Great Britain, residing at Glen Capel, Central avenue, Leicester, Leicestershire, England, have invented new and useful Improvements in Teapots, Coffee-Pots, and Like Vessels, of which the following is a specification.

My invention relates to teapots, coffee-pots and like vessels closed at the top and provided with a spout and handle.

In such a vessel as now generally constructed the spout and handle project from the body and are liable for this reason, especially in hotels, restaurants and the like, to be injured or broken.

The object of my invention is to obviate this liability and to this end my invention consists in constructing a teapot or like vessel so that the spout and handle do not project beyond the body, or, in other words, so that they are within the boundaries of the body of such vessel.

According to my invention the spout is formed by applying to the inner wall of the body a partition which forms a channel extending from near the bottom of the vessel to a hole or aperture formed near the top thereof, while the handle is formed in a manner already known by making a hollow or depression behind a portion of the outer wall, in such a way that the said handle extends across the depression, while openings are formed on either side through which the fingers can be passed.

The improved pot or vessel can be of square, round or other convenient shape and when the square form is used the spout is preferably arranged at one angle of the vessel and the handle is formed at the opposite angle.

It is to be understood that the improved pot can be of molded earthenware or the like or made of metal.

My invention will be readily understood by reference to the accompanying drawing, in which:—

Figure 1 is a perspective view of a square pot.

Fig. 2 is a central section through the spout, and

Fig. 3 is a section on the line 3—3, Fig. 2.

In these figures $a$ indicates the body of the pot, $b$ the spout which is formed by the internal partition $c$, $d$ the handle and $e$ the lid.

With the construction shown the spout and handle do not present any projections which would prevent a number of similar pots being ranged side by side with their bodies close together. Also the lid is made flush with the top of the body, thereby allowing the pots to be stacked one upon another.

As hereinbefore stated the pots may be made of earthenware, metal or other suitable material. When earthenware or the like is used the body of the pot is preferably formed without the angle containing the spout, the latter, which has the shape of the part to the left of the line 4—4, Fig. 3, being subsequently applied to the body as a separate piece. This construction is very much simpler than applying the partition $c$ within the body. $f$, $f$ are the strainer holes formed in the partition $c$.

The handle $d$ is also preferably applied as a separate part after the recess $g$ for the fingers has been formed.

In order that the spout shall pour properly a recess $h$ is formed beneath the top of the pot, above the spout, as shown, and this recess is advantageously carried around the pot as an ornamentation. The angle of the spout, immediately beneath the lip, is preferably indented as at $i$ in a well known manner to improve the pouring.

What I claim and desire to secure by Letters Patent is:—

1. A teapot or the like, comprising a body having a top and a groove located in the side of the body below the top, a spout opening provided in the body and merging into the groove, a partition located in the body and forming a spout, and a handle located within the boundary of the body.

2. A teapot or the like, comprising a body having a plurality of corners and provided with a groove below its top, a spout arranged within the body in one of said corners and having an outlet opening into said groove, and a handle located within the boundary of the body, whereby a vessel is provided having no projecting parts.

ROBERT CRAWFORD JOHNSON.